Patented Apr. 21, 1931

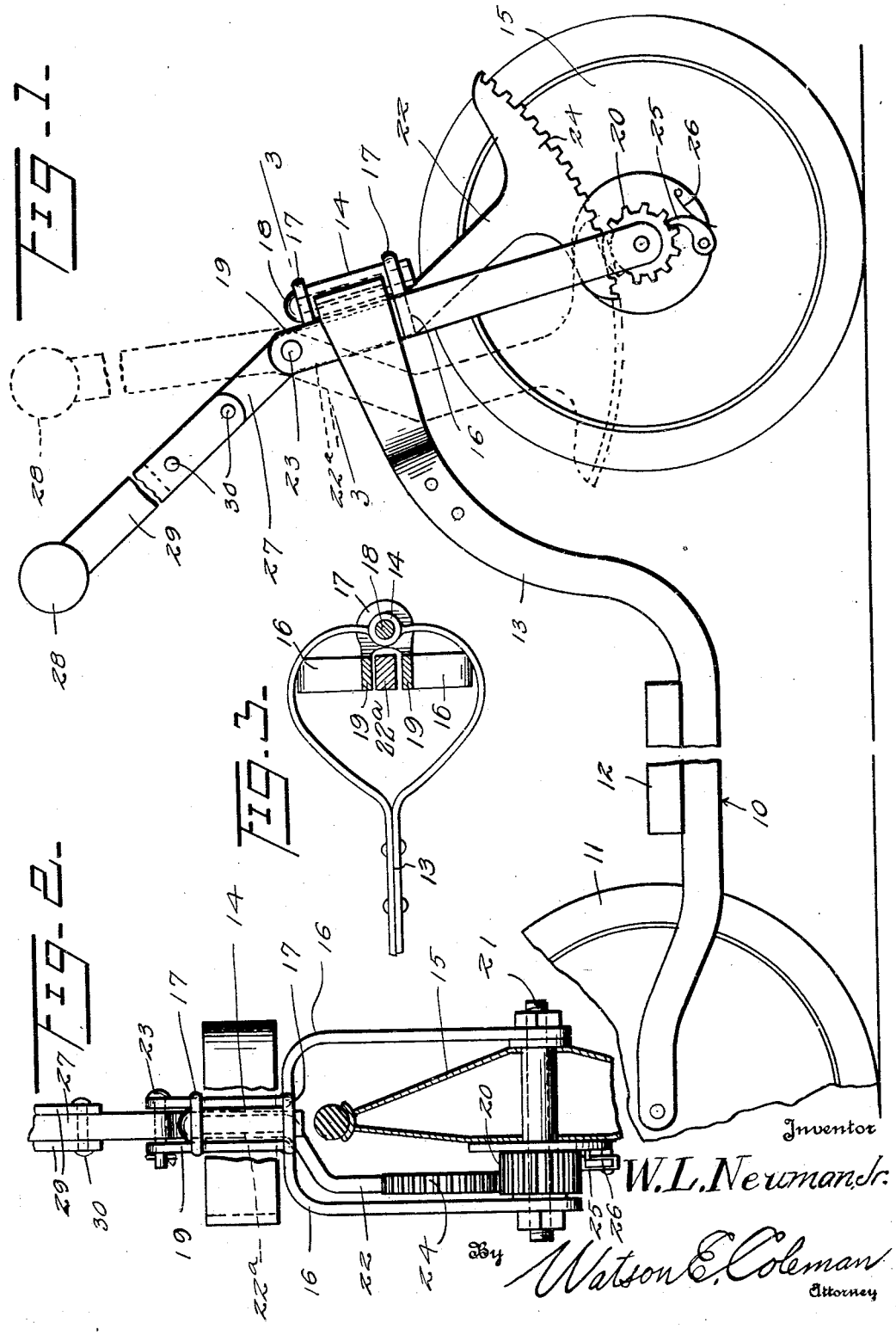

1,801,526

UNITED STATES PATENT OFFICE

WILLIAM L. NEUMAN, JR., OF SEATTLE, WASHINGTON

POWER SCOOTER

Application filed May 31, 1930. Serial No. 458,330.

The present invention relates to toy vehicles and more particularly to a scooter.

An object of this invention is to provide a scooter which has a power wheel at the forward end thereof so that the device may be propelled by rocking of the handle.

Another object of this invention is to provide a simple and practical gear mechanism which may be mounted at the forward end of the scooter by means of which the front wheel may be rotated through the oscillation or reciprocation of the handle.

A further object of this invention is to provide a power scooter having a front wheel drive which is so constructed that the driving of the front wheel will not interfere in any manner with the steering of the vehicle.

The above and various other objects and advantages of this invention will in part be described in and in part be understood from the following detailed description of the present preferred embodiment, the same being illustrated in the accompanying drawing wherein:—

Figure 1 is a fragmentary detail side elevation of a device constructed according to the preferred embodiment of this invention;

Figure 2 is a fragmentary front elevation partly in section of the device; and

Figure 3 is a sectional view partly in detail taken on the line 3—3 of Figure 1.

Referring to the drawing wherein like numerals of reference designate corresponding parts throughout the several views, the numeral 10 designates generally a frame of a scooter or the like which is constructed according to the preferred embodiment of this invention, the frame 10 having a rear wheel 11 pivotally mounted thereon and a conventional footboard 12. The frame 10 is adapted to extend upwardly at the forward end thereof as at 13 and the frame members converge together at the extreme forward end and a bearing 14 is secured thereto.

A front wheel 15 is rotatably mounted on a fork 16, the fork 16 having outstanding ears 17 for engagement with the bearing 14 and a pivotal member 18 extends through the bearing 14 and the outstanding arms 17 so as to hold the fork 16 in desired position upon the frame. The fork 16 preferably extends between the converging ends 13 of the frame 10 and preferably terminates in a pair of spaced arms 19 which extend slightly above the upper outstanding bearing arms 17. The front wheel 15 together with the rear wheel 11 may be of any conventional construction, being either of the artillery type or the disc wheel type.

A gear 20 is rotatably mounted on the shaft 21 upon which the front wheel 15 is mounted, the gear 20 being loosely mounted upon the shaft and adapted for independent movement with respect to the wheel 15. An operating member generally designated as 22 is rockably secured between the upstanding arms 19, being fulcrumed on a pivot 23, and the lower end of the operating member 22 is provided with a segmental gear rack 24 which is in gear engagement with the gear member 20.

The operating member 22 is preferably angularly inclined as at 22ª and when the operating member 22 is rocked upon the pivot 23 the angular extension 22ª engages against the forward end of the frame members 13 so as to limit the rocking movement of the operating member 22.

A pawl member 25 is mounted on the wheel 15 and a spring 26 engages the pawl 25 and constantly urges the pawl 25 into engagement with the teeth of the gear 20. The operating member 22 is provided with an extension 27 which extends upwardly and above the pivot 23 and a handle 28 is secured to the extension 27 by means of connecting bars 29, the connecting bars 29 being preferably riveted or otherwise secured to the extension 27 by means of rivets or bolts 30 or the like.

In the operation of this device, the operating member 22 may be rocked by means of the handle 28 and the connecting bars 29, and the rocking or swinging movement of the operating member 22 will coactively swing the gear rack 24 and rotate the gear 20 about the shaft 21. The pawl member 25 while the handle is being moved rearwardly will hold the gear member against movement with respect to the wheel 15 so that the wheel 15 will rotate cooperatively with the rotation of the gear 20. When the handle 28 is swung forwardly the gear 20 will rotate idly upon the shaft 21 and reversely from the rotation of the wheel 15.

It will be obvious from the foregoing that the rocking movement of the handle 28 will cooperatively rotate the gear 20 and the front wheel 15 so as to move the vehicle forwardly. The extension arms 29 may be of any desired length so that the handle 28 may be grasped conveniently by standing upon the footboard 12.

It will also be obvious that a simple and practical scooter has been devised by means of which the scooter may be driven by a child, and that various changes and modifications may be made in the details of construction and design of the above specifically described embodiment of the invention without departing from the spirit thereof, such changes and modifications being restricted only by the scope of the following claims.

What is claimed is:—

1. A power scooter of the character described comprising a frame having a looped forward end, a rear wheel rotatably carried by the frame, a front wheel, a fork pivotally mounted on the looped portion of the frame, an axle mounted on the fork and engaging the front wheel, a gear loosely mounted on the axle intermediate one arm of the fork and one side of the wheel, a spring pressed pawl mounted on the wheel and engaging the gear, and rockably operating means carried by the forward end of the fork and extending through the loop and engaging said gear for rotation thereof.

2. A power scooter of the character described comprising a frame having a looped forward end, a rear wheel rotatably mounted on the frame, a front bearing mounted on said looped end, a fork swingably mounted on the frame at the forward end thereof, a front axle mounted on the fork, a front wheel rotatably mounted on said axle, a gear loosely mounted on said axle intermediate one side of the wheel and one arm of the fork, a spring pressed pawl carried by the front wheel and engaging the gear, and a steering member rockably connected to said fork and extending downwardly through said looped end, said steering member having a segmental gear at one end thereof engaging said gear whereby to rotate the gear upon rocking movement of the handle.

3. A power scooter of the character described comprising a frame, a rear wheel rotatably mounted on the frame, a swingable fork mounted on the front end of the frame, an axle mounted on the fork, a front wheel rotatably mounted on the axle, said fork having a pair of spaced upstanding arms, said frame having a bearing at the forward end thereof, means for swingably mounting the fork on the frame at a point spaced rearwardly from the forward end of the frame, a gear rotatably mounted on the axle, a spring pressed pawl member mounted on the front wheel and engaging said gear, a rockable handle pivotally mounted between said spaced arms of said fork, said handle having a segmental gear rack at the lower end thereof engaging said rotatable gear whereby to rotate said gear on said axle, and means for limiting the rocking movement of said handle upon said fork.

In testimony whereof I hereunto affix my signature.

WILLIAM L. NEUMAN, Jr.